(12) United States Patent
Kobara et al.

(10) Patent No.: US 6,697,889 B2
(45) Date of Patent: Feb. 24, 2004

(54) FIRST-IN FIRST-OUT DATA TRANSFER CONTROL DEVICE HAVING A PLURALITY OF BANKS

(75) Inventors: Junko Kobara, Hyogo (JP); Hiroyuki Kawai, Hyogo (JP); Yoshitsugu Inoue, Hyogo (JP); Robert Streitenberger, Hyogo (JP)

(73) Assignee: Renesas Technology Corp., Tokyo (JP)

( * ) Notice: Subject to any disclaimer, the term of this patent is extended or adjusted under 35 U.S.C. 154(b) by 443 days.

(21) Appl. No.: 09/778,778

(22) Filed: Feb. 8, 2001

(65) Prior Publication Data

US 2001/0029558 A1 Oct. 11, 2001

(30) Foreign Application Priority Data

Apr. 7, 2000 (JP) .................................. 2000-106780

(51) Int. Cl.[7] .............................................. G06F 13/36
(52) U.S. Cl. .............................. 710/57; 710/33; 710/34; 710/52; 710/53
(58) Field of Search .............................. 710/33, 34, 52, 710/53, 57

(56) References Cited

U.S. PATENT DOCUMENTS

| | | | | |
|---|---|---|---|---|
| 4,740,958 A | * | 4/1988 | Duxbury et al. | 370/216 |
| 4,995,056 A | * | 2/1991 | Fogg et al. | 375/220 |
| 6,101,329 A | * | 8/2000 | Graef | 710/52 |
| 6,172,927 B1 | * | 1/2001 | Taylor | 365/219 |
| 6,188,699 B1 | * | 2/2001 | Lang et al. | 370/463 |
| 6,463,485 B1 | * | 10/2002 | Chui et al. | 710/52 |

FOREIGN PATENT DOCUMENTS

| | | |
|---|---|---|
| JP | 63-167949 | 7/1988 |
| JP | 5-46547 | 2/1993 |
| JP | 11-161467 | 6/1999 |

* cited by examiner

*Primary Examiner*—Jeffrey Gaffin
*Assistant Examiner*—Tammara Peyton
(74) *Attorney, Agent, or Firm*—McDermott, Will & Emery

(57) ABSTRACT

An FIFO data transfer control device includes an instruction analyzing portion for analyzing an instruction for data transfer to an FIFO storage device including a plurality of banks, and calculating an amount of data to be transferred; a data count portion for calculating, from the data amount calculated by the instruction analyzing portion, an amount of the data written in the bank being in an outputting state, and issuing a determination flag indicating whether the free space of the bank being in the outputting state satisfies predetermined conditions or not; and a full check portion for inhibiting processing of a next instruction until the determination flag sent from the data count portion or the full flag issued from the FIFO storage device is reset.

2 Claims, 19 Drawing Sheets

OFIFO_full_flag_m IS RESET
WHEN 4 OR MORE DATA ARE READ OUT

FIRST-IN FIRST-OUT DATA TRANSFER CONTROL DEVICE HAVING A PLURALITY OF BANKS

BACKGROUND OF THE INVENTION

1. Field of the Invention

The present invention relates to an FIFO (First-In First-Out) data transfer control device for controlling transfer, which is performed in a processor having a plurality of operation units for transferring an arbitrary number of data to an output device via a first-in first-out storage device in accordance with one instruction. This first-in first-out storage device will be simply referred to as an "FIFO" hereinafter. Particularly, the invention relates to an FIFO data transfer control device which can prevent overflow from the FIFO.

2. Description of the Background Art

In a processor or the like having a plurality of operation units, an FIFO is used for absorbing differences in processing timing with respect to an output device. Referring to FIG. 22, a processor 140 in the prior art includes a plurality of operation units 40, an output FIFO data transfer control device 142 receiving the outputs of operation units 40, and an output FIFO 44 which temporarily holds the output of output FIFO data transfer control device 142, and then sends it to an output device 46.

Output FIFO data transfer control device 142 includes an instruction analyzing portion 150 for analyzing a write instruction for output FIFO 44, a data count portion 152 for counting the number of data written into output FIFO 44, a check flag producing portion 154 for producing a flag to be used for determining whether output FIFO is "Full" or not, and a Full check portion 156 for determining whether output FIFO 44 is in the Full state based on the Full flag produced by check flag producing portion 154.

Referring to FIG. 23, output FIFO data transfer control device 142 operates as follows. First, instruction analyzing portion 150 analyzes the write instruction sent from operation unit 40 for output FIFO 44, and writes the data into output FIFO 44 in a step 1 (the "step" will be simply referred to as "S" in the following description). Data count portion 152 increments the count every time instruction analyzing portion 150 writes the data into output FIFO 44 (S2) so that the number of data written into output FIFO 44 is counted. Check flag producing portion 154 sets the check flag (fullcheck) when the count value of data count portion 152 is equal to or larger than the size of output FIFO 44.

In output FIFO 44, if it is impossible to write the data into a bank next to a bank into which data is being written, the flag of OFIFO_full_flag is set to indicate this fact. Full check portion 156 obtains a logical AND between OFIFO_full_flag and fullcheck. If the logical AND is equal to 1, Full check portion 156 determines that writing into FIFO 44 is impossible, and sets the value of flag fullcheck to 1 (S3). In this case, therefore, the check portion 156 suspends the write operation, which is to be performed for writing data into output FIFO 44 in accordance with the next instruction, until all the data in the next bank of output FIFO 44 is completely read out and thus the next bank becomes empty (i.e., until OFIFO_full_flag becomes equal to 0) (S5).

According to the conventional method described above, it is detected that data has been written into an end of a certain bank in output FIFO 44, and therefore has reached the end of the bank. Thereafter, it is determined whether data can be written into the next bank. Thus, determination of whether data can be written into the next bank is performed after the data is written into the end of the bank preceding the next bank.

Therefore, the conventional method suffers from such a problem that the data writing cannot be stopped even when Full check portion 156 determines that the writing to the next bank is impossible, if the data must be stored into two or more banks in accordance with one data transfer instruction.

For overcoming the above problem, it is necessary on the side of program, which is to be executed by the processor, to check the Full state of output FIFO 44 without fail before performing the processing of writing the data into output FIFO 44. If the output FIFO data transfer control device in the prior art is used for this check processing, the data processing transfer speed is lowered.

Referring to FIG. 24, it is assumed that output FIFO 44 has a four-bank structure. As shown in FIG. 24, it is also assumed that a free space corresponding to one data is present in an end of bank 2, and bank 3 is already written entirely. In the conventional method, the FULL check is performed at the time when the last data is written in bank 2. Therefore, overwriting occurs, for example, if the instruction for writing the last data in the bank 2 requests the transfer of two or more (e.g., three) data. More specifically, the overwriting occurs in spite of the fact that the two data in bank 3 are not yet read out.

For preventing the above problem, it is necessary on the program side to check whether output FIFO 44 is in the Full state before the transfer, as already described. In some cases, this check must be performed every time the instruction is issued.

A proposal for overcoming the above problem is disclosed in Japanese Patent Laying-Open No. 11-161467. According to the prior art disclosed in this publication, a memory is divided by an appropriate boundary into two blocks, which are used as different FIFOs, respectively. A method of calculating the next write position of each FIFO (i.e., determining the next address) is devised so as to prevent complication of a circuit structure of a write/read control circuit. Also, a comparison between the size of next data to be written and the free space is made in each FIFO, and it is determined for each FIFO whether the free space is insufficient or not, and whether the writing can be performed or not.

In this prior art, the number of FIFOs is restricted to two, and therefore data of a large capacity cannot be handled. Since the two blocks are used as different FIFOs, respectively, the utilization efficiency of the memory region is low.

Japanese Patent Laying-Open No. 63-167949 has disclosed a data transfer system, which is formed of a plurality of FIFOs connected in series, and can achieve a high efficiency. According to this system, information indicating whether an FIFO buffer is empty or not is available for each FIFO, and thereby an extent or degree of a total free space in the FIFOs is determined. The size of the free space thus determined is compared with the size of the transfer data, and the data is written into the FIFO buffer only when the free space is larger than the data.

In this prior art, information indicating whether the FIFO is empty or not is obtained for each FIFO, and it is determined that each FIFO is not empty when even one data is written into the same FIFO. Accordingly, even if the FIFO actually has a free space, this free space cannot be used in some cases. Therefore, the whole region of the FIFO cannot be used efficiently so that the transfer efficiency likewise becomes low.

SUMMARY OF THE INVENTION

Accordingly, an object of the invention is to provide an FIFO data transfer control device, in which management or control of a free space in an FIFO by a program is not required, and therefore a data transfer processing speed can be increased.

Another object of the invention is to provide an FIFO data transfer control device, in which management or control of a free space in an FIFO by a program is not required, and an FIFO region can be efficiently used so that a data transfer processing speed can be increased.

Yet another object of the invention is to provide an FIFO data transfer control device, in which management or control of a free space in an FIFO by a program is not required, and the free space of the FIFO can be efficiently utilized in accordance with an amount of data to be processed by a program to be executed so that a data transfer processing speed can be increased.

According to the invention, an FIFO data transfer control device includes an instruction analyzing circuit for analyzing an instruction for data transfer by an operation unit to an FIFO storage device formed of a plurality of banks, calculating an amount of data to be transferred, and writing the data into the FIFO storage device. The FIFO storage device has a function of issuing a Full flag when a bank next to a bank being in a writing state is in a Full state. This FIFO data transfer control device further includes a data count circuit for calculating, from the data amount calculated by the instruction analyzing circuit, an amount of the data written in the bank being in an outputting state, and issuing a determination flag by determining whether the free space of the bank being in the outputting state satisfies predetermined conditions or not; and a Full check circuit for inhibiting processing of a next instruction until the determination flag sent from the data count circuit or the Full flag issued from the FIFO storage device is reset.

After the processing of the instruction, the free space of the bank being in the outputting state in the FIFO storage device is calculated, and the processing of the next instruction is inhibited when the calculated free space does not satisfy certain conditions, and at the same time the next bank in the Full state. Before reaching the end of the bank, it is determined whether the writing of the next data does not cause a disadvantage or not. Therefore, there is no possibility that overwrite of data occurs. It is not necessary to perform determination for each of the plurality of banks whether the bank is Full or not. Further, processing by a program for preventing the overwrite of data is not required.

Preferably, the data count circuit calculates the amount of data written in the bank being in the outputting state from the data amount calculated by the instruction analyzing circuit, and issues a determination flag by determining whether conditions that the free space in the bank being in the outputting state is equal to or larger than the maximum amount of data being transferable at one time are satisfied or not.

When the free space equal to or larger than the maximum amount of data transferable at one time is ensured, or when the next bank attains a state other than the Full state, processing of the next instruction starts. Therefore, overwriting does not occur even when the maximum amount of data is transferred to the FIFO storage device in accordance with the next instruction.

According to another aspect of the invention, an FIFO data transfer control device includes an instruction analyzing circuit for analyzing a data transfer instruction issued by an operation unit to an FIFO storage device, calculating an amount of the data to be transferred, and writing the calculated data amount into the FIFO storage device. The FIFO storage device issues a read signal indicating the number of data read from the FIFO storage device when the data is read from the FIFO storage device. The FIFO data transfer control device further includes a data count circuit for calculating, from the data amount calculated by the instruction analyzing circuit and the read signal, a free space of the FIFO storage device, and issuing a determination flag by determining whether the free space of the FIFO storage device satisfies predetermined conditions or not; and a Full check circuit for inhibiting processing of a next instruction until the determination flag sent from the data count circuit is reset.

After the processing of the instruction, the free space of the FIFO storage device is calculated, and the processing of the next instruction is inhibited when the calculated free space does not satisfy certain conditions. Since the next instruction is processed only after presence of the sufficient free space is confirmed. Therefore, there is no possibility that overwrite of data occurs. Further, processing by a program for preventing the overwrite of data is not necessary. Therefore, the processing speed can be increased.

The FIFO storage device may include a plurality of banks or a single bank. In either case, the data transfer processing can be performed at a high speed.

Preferably, the data count circuit calculates the free space of the FIFO storage device from the data amount calculated by the instruction analyzing circuit and the read signal, and issues the determination flag by determining whether conditions that the free space in the FIFO storage device is equal to or larger than the maximum amount of data being transferable at one time are satisfied or not.

The next instruction is processed only when the free space of the FIFO storage device is equal to or larger than the maximum amount of data transferable at one time. Therefore, overwrite of data does not occur even when the maximum amount of data is to be transferred in accordance with the next instruction. Accordingly, processing by a program for preventing the overwrite of data is not necessary, and the processing speed can be increased.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1:
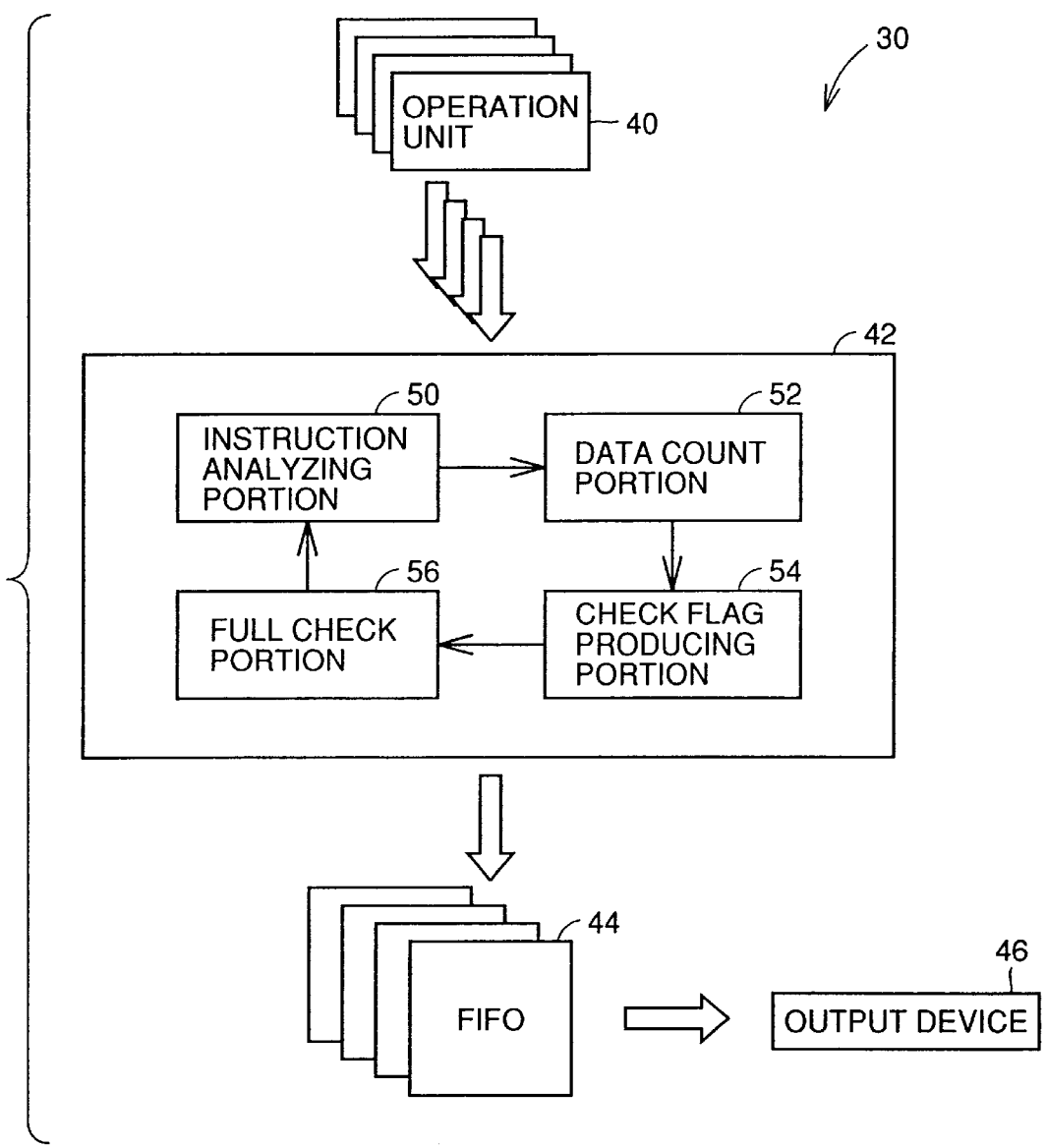
FIG. 1 is a block diagram of a processor including an output FIFO data transfer control device according to a first embodiment of the invention.

Referring to FIG. 1, a processor 30 includes an output FIFO data transfer control device according to a first embodiment of the invention. Processor 30 includes a plurality of operation units 40, an output FIFO data transfer control device 42 receiving data sent from operation units 40, and an output FIFO 44 which is controlled by output FIFO data transfer control device 42 to transfer the data sent from operation unit 40 to an output device 46 after temporarily holding the data, and is formed of a plurality of banks.

Output FIFO data transfer control device 42 includes an instruction analyzing portion 50 which analyzes a write instruction for writing data into output FIFO 44, and calculates the number (m) of data issued to output FIFO 44 in accordance with this write instruction, a data count portion 52 for counting the data already written into each bank of output FIFO 44, a check flag producing portion 54 producing a flag for checking whether the bank in output FIFO 44 is in the Full state or not, and a Full check portion 56 for checking whether the size of the free space in output FIFO 44 satisfies predetermined conditions or not, and can inhibit instruction analyzing portion 50 from processing the next instruction in accordance with the result of this checking.

Figure 2:
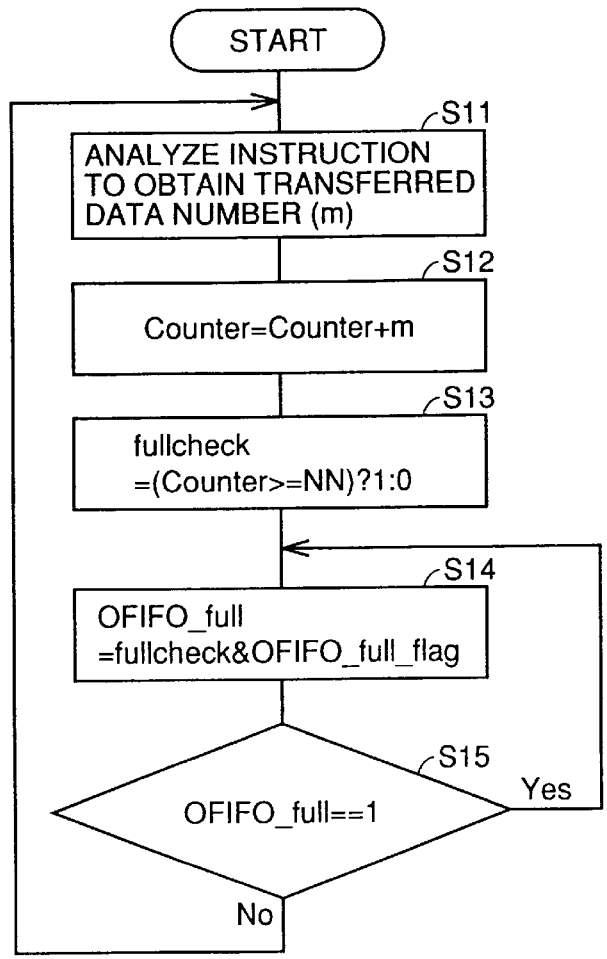
FIG. 2 is a flowchart of a control program of the output FIFO data transfer control device according to the first embodiment of the invention.

Referring to FIG. 2, output FIFO data transfer control device 42 operates as follows. Instruction analyzing portion 50 analyzes an instruction to calculate the number (m) of data to be written in output FIFO 44 (S11), and writes the data into output FIFO 44. Data count portion 52 adds the value of m to the counter value indicating the number of data which are already written in each bank of output FIFO 44. Thus, the value Counter of the counter is calculated in accordance with the following formula (S21).

$$\text{Counter} = \text{Counter} + m \tag{1}$$

Check flag producing portion 54 makes a comparison between the counter value Counter and a number (NN=N−M) which is obtained by subtracting the maximum number (M) of data, which can be written by one instruction, from the size (N) of output FIFO 44. Check flag producing portion 54 sets the check flag fullcheck if the counter value Counter is equal to or larger than NN, and otherwise resets it (S13). This can be written in C notation as follows.

$$\text{fullcheck} = (NN = (N-M)) <= \text{counter}) ? 1 : 0 \tag{2}$$

Full check portion 56 obtains the logical AND between a flag OFIFO_full_flag, which indicates whether writing into the next bank in output FIFO 44 is allowed or not, and check flag fullcheck produced by check flag producing portion 54 (S14). It is assumed that flag OFIFO_full_flag takes on the value of 1 if the writing is not allowed, and otherwise takes on the value of 0. It is determined whether result OFIFO_full of the AND is 1 or not (S15). When result OFIFO_full is 1, the processing returns to S14 ("YES" in S15). As a result, the processing in S14 and S15 is repeated, and the processing of the instruction for writing next data into output FIFO 44 is stopped until the data of output FIFO 44 is read out and OFIFO_full_flag is reset. It is assumed that OFIFO_full_flag is set when data is first written into the bank in the Nth position while the FIFO is in such a state that data is already written into the banks in and before (N−1)th position among the banks of N in number included in the FIFO, and all the data is not yet read out.

When the result of determination in S15 is "NO", the processing returns to S11, and the processing for the next instruction is performed.

According to the above structure, the number of data written into output FIFO 44 is counted before writing the data into output FIFO 44, and it is necessarily determined in the end of the bank whether the size of free space in output FIFO 44 satisfies predetermined conditions or not. As a result, it is possible to determine quickly by hardware whether there is a possibility that the bank attains the Full state or not, when data transfer across different banks was performed. It is not necessary to determine on a program side whether the bank is in the "Full" state or not. Accordingly, it is possible to avoid software processing which can be performed only at a low speed, and the data transfer speed can be improved.

A specific example of the operation of the output FIFO data transfer control device of the first embodiment will now be described.

Figure 3:
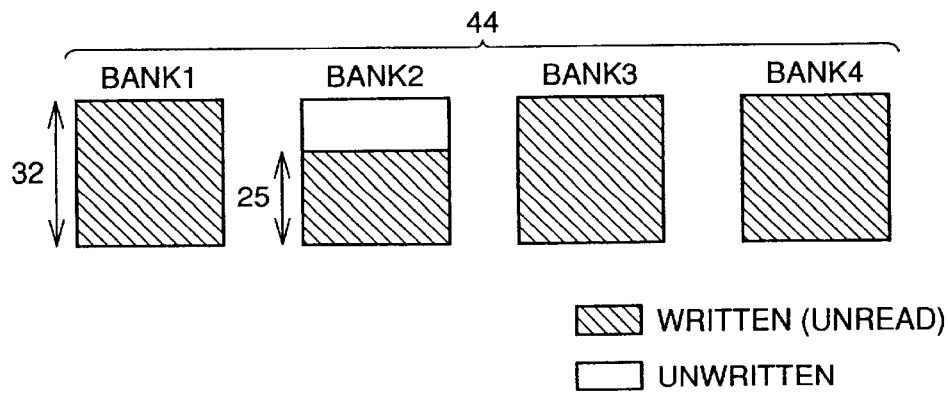
FIG. 3 is a schematic view of an FIFO for showing an operation of the output FIFO data transfer control device according to the first embodiment of the invention.

As shown in FIG. 3, it is assumed that output FIFO 44 includes four banks "Bank 1"–"Bank 4", and each bank has a size of 32. In this case, the value of (NN=N−M) in the formula (2) is equal to NN=32−4=28. Therefore, fullcheck is set when Counter>=28.

In FIG. 3, data is already written (and is not yet read out) in hatched portions. Thus, it is assumed that banks 1, 3 and 4 are fully written, and only bank 2 has a written portion corresponding to only 25 and an unwritten portion. It is also assumed that the operation units are four in number, and up to four data can be simultaneously transferred in response to one instruction. The data is being written into bank 2. In this state, data cannot be written into the next bank (bank 3) so that OFIFO_full_flag is set.

It is assumed that the following instructions are successively issued in the above state, and the states which output FIFO 44 attains in such situations will now be described.

Instruction A: transfer of one data

Instruction B: transfer of three data

Instruction C: transfer of four data (1) (S11: FIG. 2)

Figure 4:
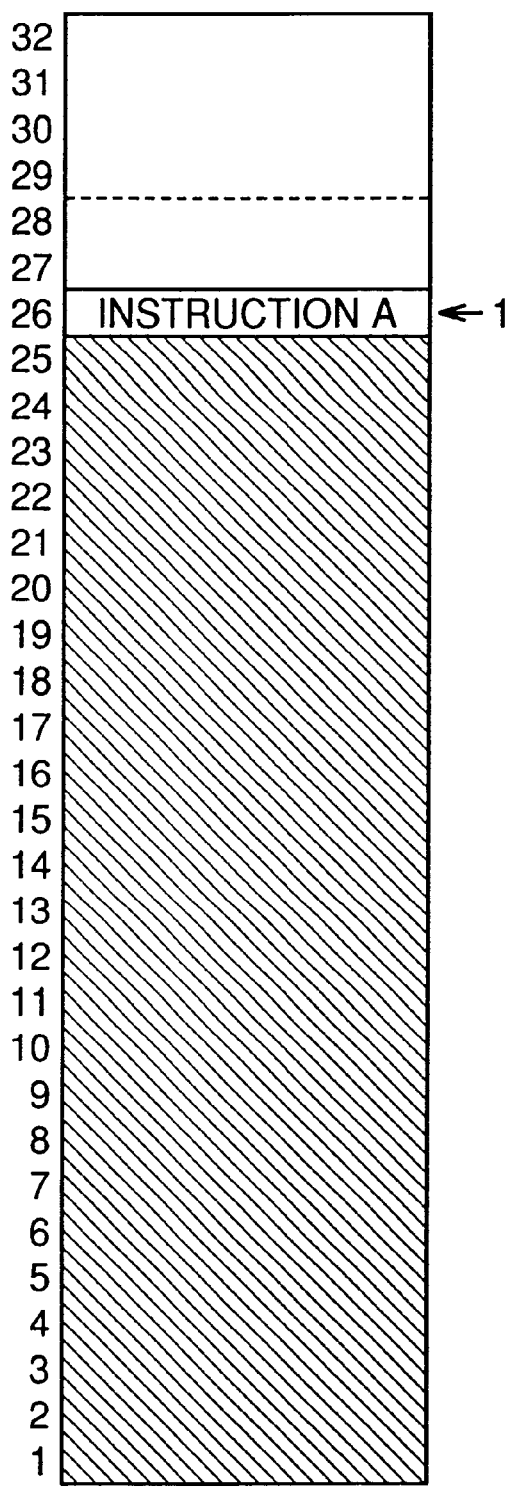
FIGS. 4 to 7 are schematic views of a bank 2 of the FIFO for showing operations of the output FIFO data transfer control device according to the first embodiment of the invention.

Full check portion 56 analyzes instruction A to obtain m=1. One data is written into output FIFO 44 (FIG. 4).

(2) (S12)

Data count portion 52 calculates Counter=Counter+1. Therefore, Counter=25+1=26 is obtained.

(3) (S13)

In check flag producing portion 54, fullcheck is not set because Counter>=28 is not satisfied.

(4) (S14 and S15)

Since fullcheck is 0, the processing returns to S11 as a result of determination in check flag producing portion 54.

(5) (S11)

Figure 5:
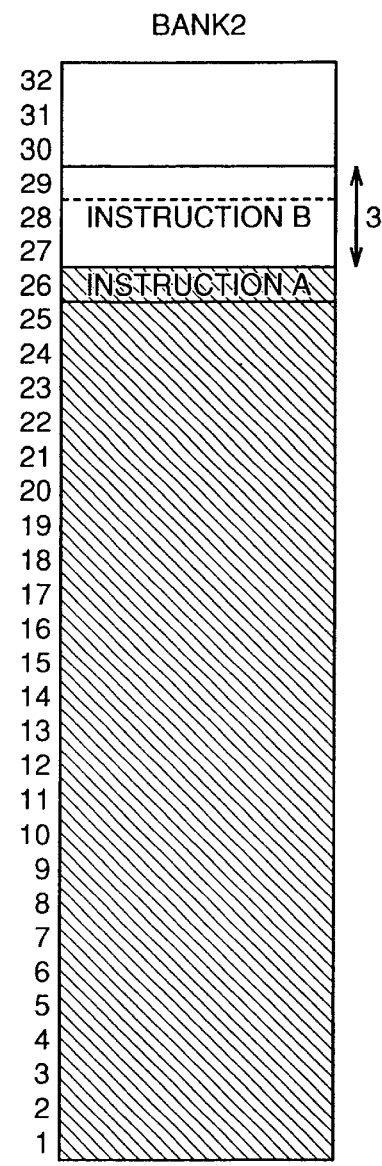

In instruction analyzing portion 50, a next instruction (instruction B) is analyzed to obtain m=3. Further, three data are written into output FIFO 44 (FIG. 5).

(6) (S12)

In data count portion 52, Counter=26+3=29 is obtained.

(7) (S13)

In check flag producing portion 54, fullcheck is set because Counter>=28 is satisfied.

(8) (S14)

In Full check portion 56, OFIFO_full takes on the value of 1 because fullcheck is equal to 1 and OFIFO_full_flag is equal to 1.

(9) (S15)

Figure 6:
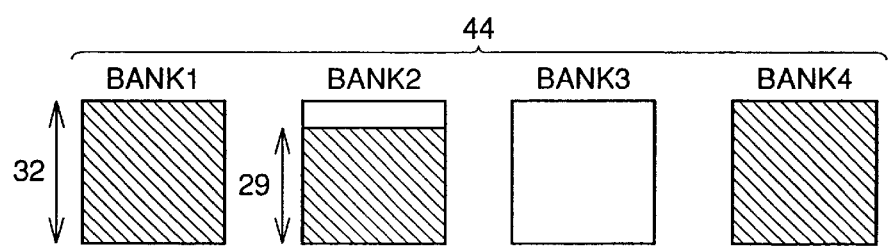

Since OFIFO_full is equal to 1, processing in Full check portion 56 (S14 and S15) is repeated until OFIFO_full_flag is reset (i.e., until data is read from bank 3 in output FIFO 44). When the data in bank 3 is read out and OFIFO_full_flag is reset, the processing returns to S11 as a result of the determination by Full check portion 56. At this time, output FIFO 44 is in the state shown in FIG. 6.

(10) (S11)

Instruction analyzing portion 50 analyzes next instruction C to obtain m=4, and four data is written into output FIFO 44.

(11) (S12)

In data count portion 52, Counter=29+4=33 is obtained.

(12) (S13)

Check flag producing portion 54 sets fullcheck because Counter>=28 is satisfied.

(13) (S14)

OFIFO_full_flag is equal to 0. Therefore, OFIFO_full, which is the determination result of Full check portion 56, is equal to 0.

(14) (S15)

Figure 7:
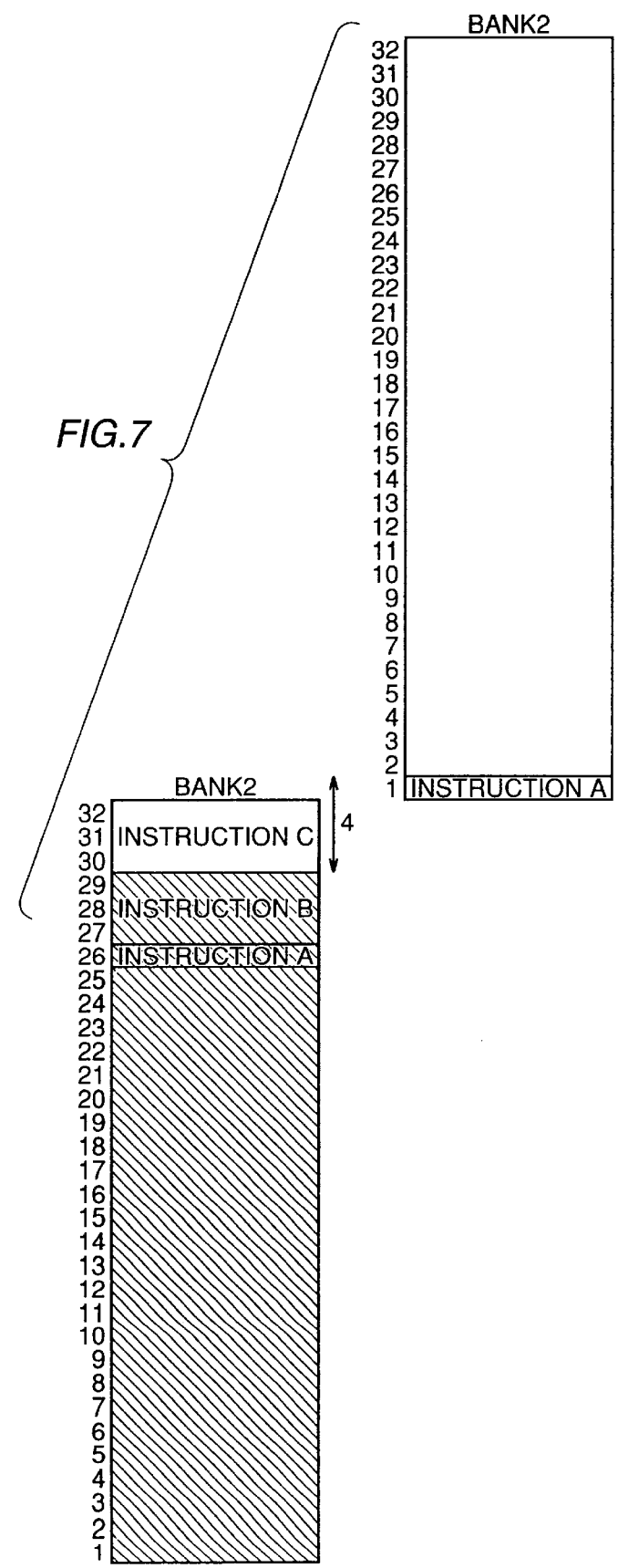

Since OFIFO_full is equal to 0, the processing returns to S11 (FIG. 7). Data transfer may be performed in accordance with an instruction which is issued subsequently. Even in this case, there is no possibility of overwrite of data because the data in bank 3 is already read out.

As described above, output FIFO data transfer control device 42 of this embodiment writes the data into output FIFO 44 in such a manner that the number of data to be written into output FIFO 44 is obtained, and the size of free space in the bank is determined at the end of the bank. When there is a possibility that the data is written across the banks, a next instruction is not accepted until such a state is attained that the data transfer to output FIFO 44 can be reliably performed. Accordingly, even in the case where the data writing must be performed across the banks, the overflow can be avoided, and there is no possibility that data is written over another data which is not yet read out. Accordingly, it is not necessary on the program side to take countermeasures against overwrite of data. As a result, the data transfer processing speed can be improved.

Second Embodiment

According to the first embodiment described above, output FIFO 44 is formed of the plurality of banks, and therefore intended transfer can be performed by the foregoing structures. However, a method similar to that of the first embodiment cannot be effectively applied to a structure where the output FIFO has only one bank, because OFIFO_full_flag cannot be reset even when the bank actually has a free space, if data is written partially in the bank. During the period before resetting, data writing is suspended. This may lower the data transfer processing speed.

The output FIFO data transfer control device according to the second embodiment has an improved structure, which can perform fast data transfer even in the case where the output FIFO has only one bank. According to the second embodiment, determination of an extent or degree of the free space in the FIFO is performed in addition to the determination with the flag, which merely indicates whether the FIFO is fully empty or not, and OFIFO_full_flag is reset when the FIFO has a free space, and otherwise is set. The output FIFO data transfer control device according to the second embodiment will be described in greater detail.

Figure 8:
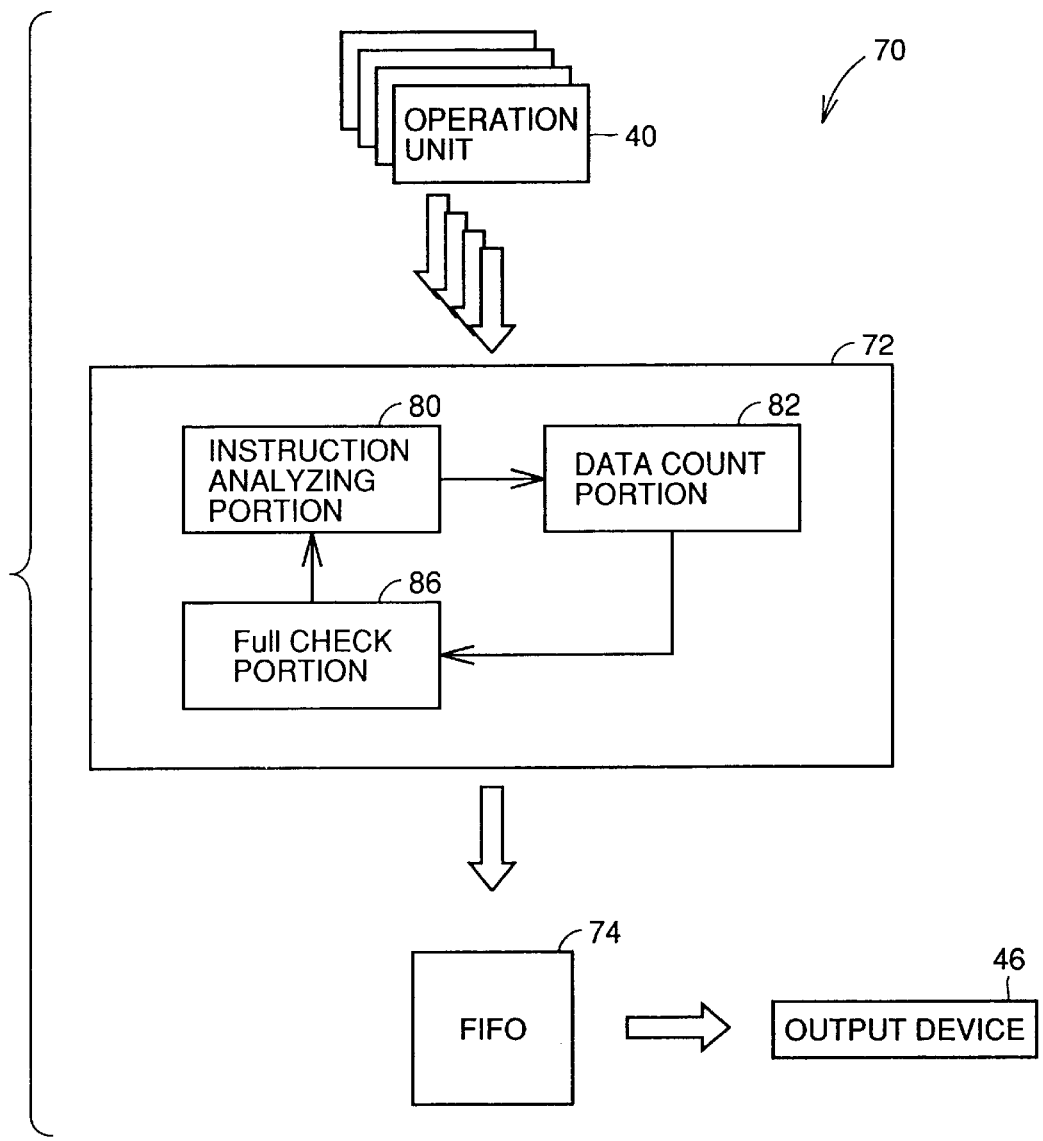
FIG. 8 is a block diagram of a processor including an output FIFO data transfer control device according to a second embodiment of the invention.

Referring to FIG. 8, a processor 70 including an output FIFO data transfer control device 72 according to the second embodiment includes operation units 40, output FIFO data transfer control device 72, and an output FIFO 74 which is formed of a single bank, and can send data received from output FIFO data transfer control device 72 to output device 46.

Output FIFO data transfer control device 72 includes an instruction analyzing portion 80 for analyzing an instruction for data writing into output FIFO 74, a data count portion 82 for checking whether output FIFO 74 has a free space or not, and a Full check portion 86 for checking whether output FIFO 74 is in the Full state or not.

Figure 9:
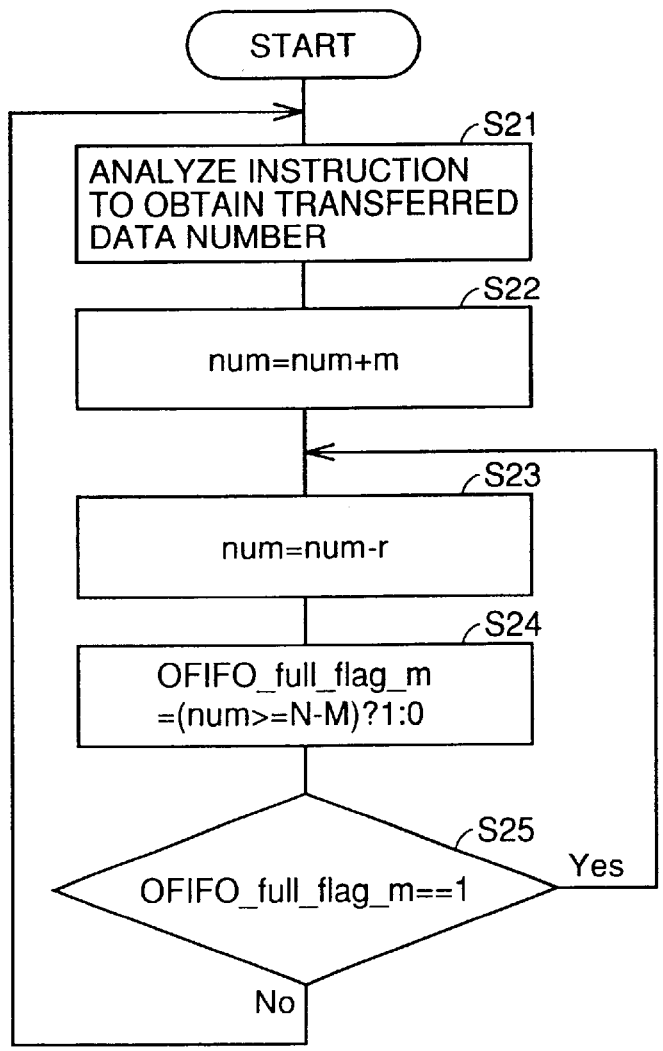
FIG. 9 is a flowchart of a control program of the output FIFO data transfer control device according to the second embodiment of the invention.

Referring to FIG. 9, output FIFO data transfer control device 72 operates as follows. When instruction analyzing portion 80 receives the instruction for data writing into output FIFO 74 from operation unit 40, it obtains the number (m) of data to be written, and writes the data into output FIFO 74 (S21). Data count portion 82 adds value m obtained by instruction analyzing portion 80 to a counter value num, which is kept in itself and represents the number of data stored in output FIFO 74. Thus, the following calculation is performed (S22).

$$num = num + m \quad (4)$$

When data is read from output FIFO 74, data count portion 82 subtracts the number (r) of read data from counter value num. Thus, the following calculation is performed (S23).

$$num = num - r \quad (5)$$

Data count portion 82 determines whether value num of the counter obtained by the above calculation is equal to or larger than value (N−M) obtained by subtracting the maximum number (M) of data, which can be transferred by one instruction, from size (N) of output FIFO 74 (S24). If num>N−M, flag OFIFO_full_flag_m is set (S24). Otherwise, flag OFIFO_full_flag_m is reset (S24). This can be written in C notation as follows:

$$OFIFO\_full\_flag\_m=(num>=N-M)?1:0 \quad (6)$$

When Full check portion 86 determines that OFIFO_full_flag_m is equal to 1, the processing returns to S23 (S25), and the processing from S23 to S25 is repeated until OFIFO_full_flag_m is reset. Thus, output FIFO data transfer control device 72 does not accept the next instruction until the data is read out from output FIFO 74 and the condition in formula (6) is no longer satisfied. When the condition of formula (6) is no longer satisfied, the control returns to S21 for waiting for processing of the next instruction.

Figure 10:
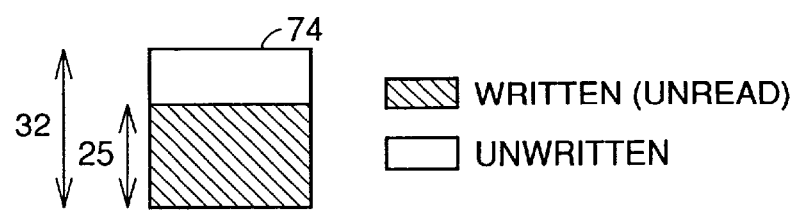
FIGS. 10 to 15 are schematic views of a bank 2 of the FIFO for showing operations of the output FIFO data transfer control device according to the second embodiment of the invention.

A specific example of output FIFO data transfer control device 72 will now be described. As shown in FIG. 10, it is assumed that output FIFO 74 has a size of 32, and includes one bank. Operation units 40 are four in number, and therefore up to four data can be simultaneously transferred. In this case, NN=N−M of formula (6) can be calculated as NN=32−4=8. Thus, output FIFO data transfer control device 72 sets OFIFO_full_flag_m when num>=28.

For example, it is assumed that 25 data are already written into output FIFO 74, and no data is yet read out (num=25) as shown in FIG. 10. In this case, the following instructions are issued, and two data are read out for a period between instructions A and B.

Instruction A: transfer of one (two read out)

Instruction B: transfer of three

Instruction C: transfer of four

In this case, the state of output FIFO 74 changes as follows in accordance with the specific operations.

(1) (S21)

Instruction analyzing portion 80 analyzes instruction A to obtain m=1. Also, one data is written into output FIFO 74.

(2) (S22)

Figure 11:
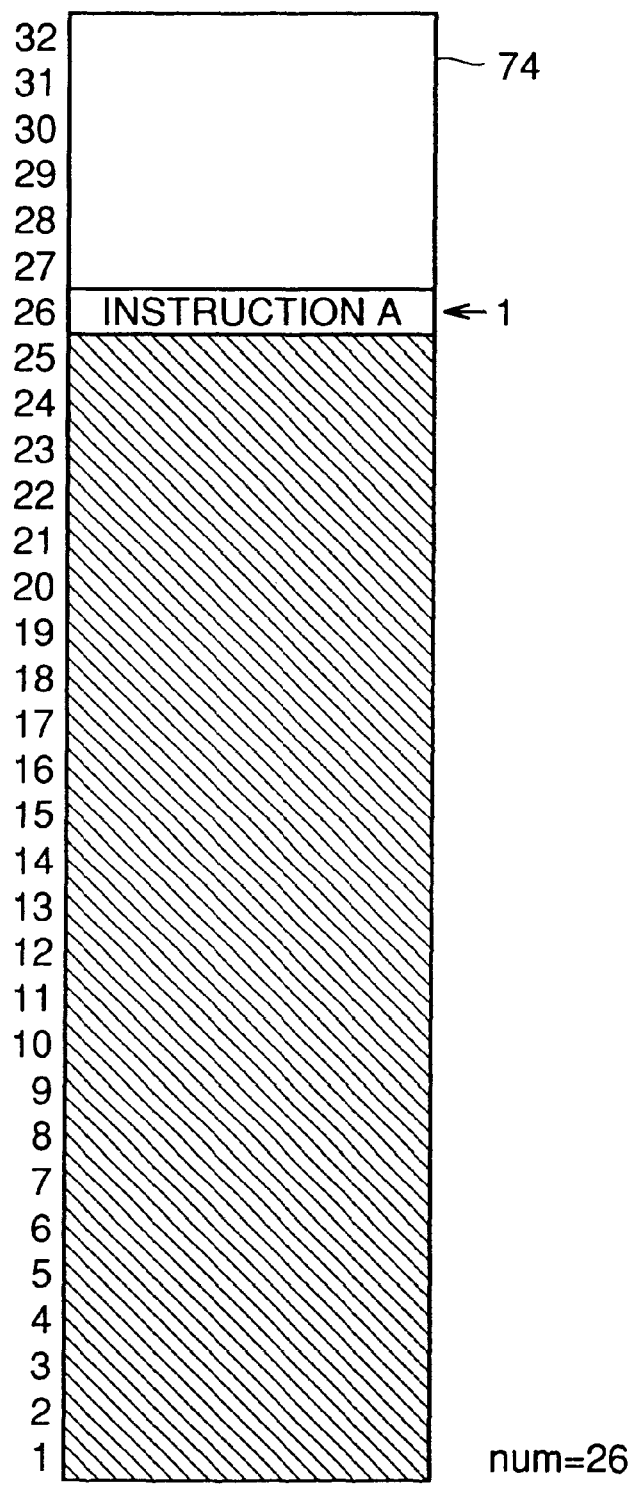

In data count portion 82, num=25+1=26 is obtained (FIG. 11).

(3) (S23)

Figure 12:
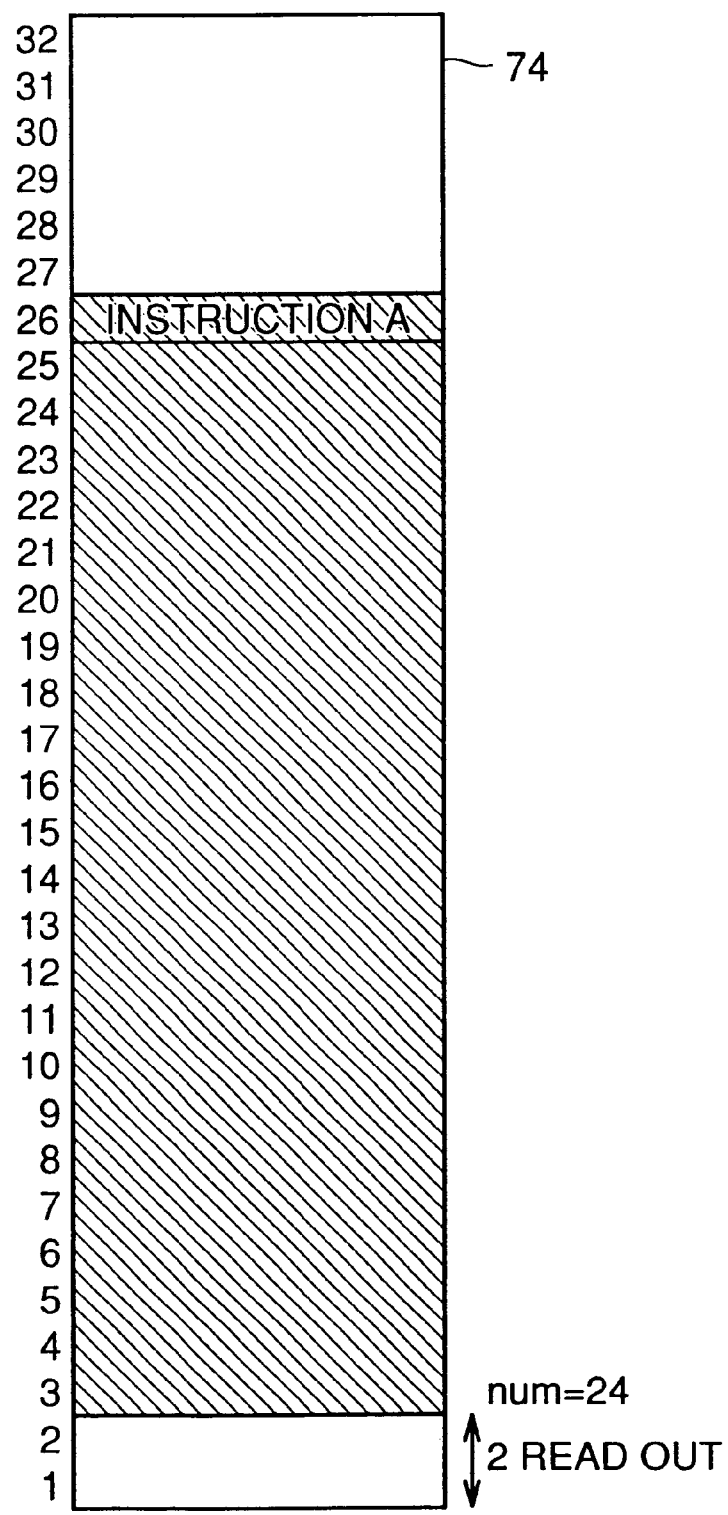

In response to reading of two data, num=26−2=24 is calculated in data count portion 82 (FIG. 12).

(4) (S24)

Since num>=28 is not satisfied, Full check portion 86 resets OFIFO_full_flag_m.

(5) (S25)

Since OFIFO_full_flag_m is equal to 0, the control returns to S21, and processing of the next instruction (instruction B) starts.

(6) (S21)

Instruction analyzing portion 80 analyzes instruction B to obtain m=3. Three data are written into output FIFO 74.

(7) (S22 and S23)

Figure 13:
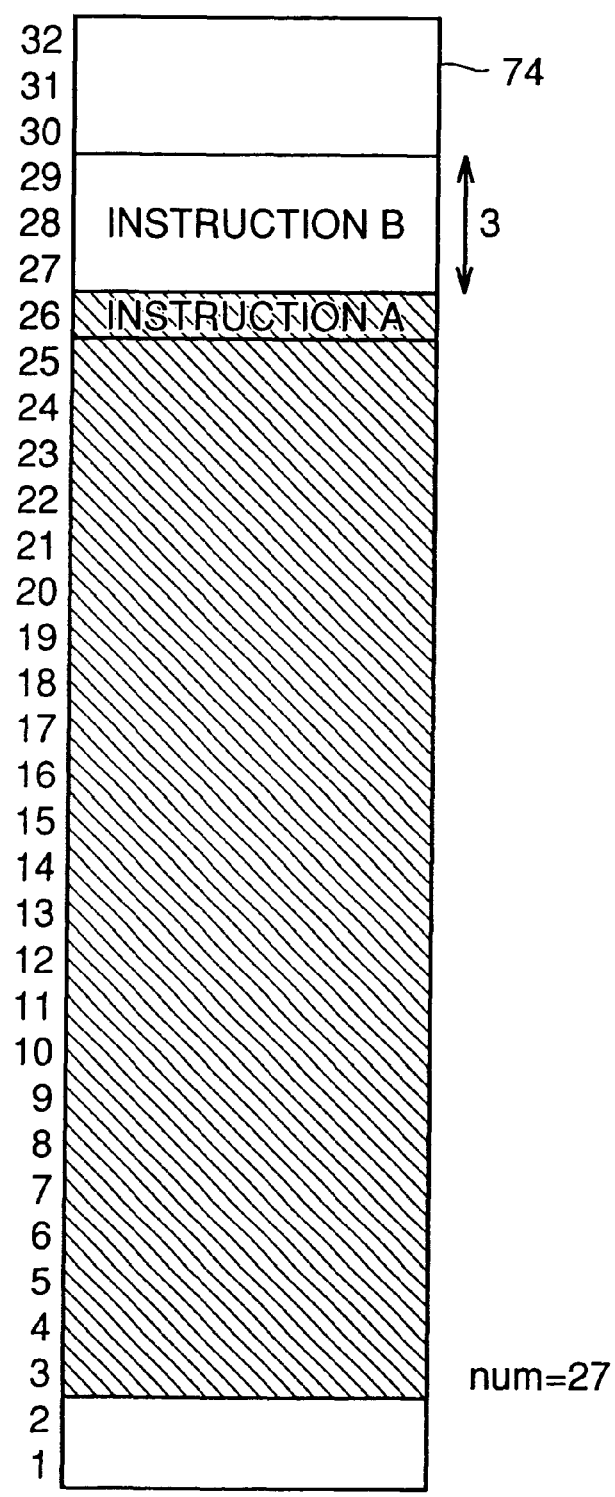

In data count portion 82, num=24+3=27 is obtained. No data is read out so that r is equal to 0 (r=0). Therefore, num is equal to 27 (num=27) (FIG. 13).

(8) (S24)

Since the relationship of num>=28 is not satisfied, Full check portion 86 resets OFIFO_full_flag_m.

(9) (S25)

Since OFIFO_full_flag_m is equal to 0, the control returns to S21, and processing of the next instruction (instruction C) starts.

(10) (S21)

Instruction analyzing portion 80 analyzes instruction C to obtain m=4. Four data are written into output FIFO 74.

(11) (S22 and S23)

Figure 14:
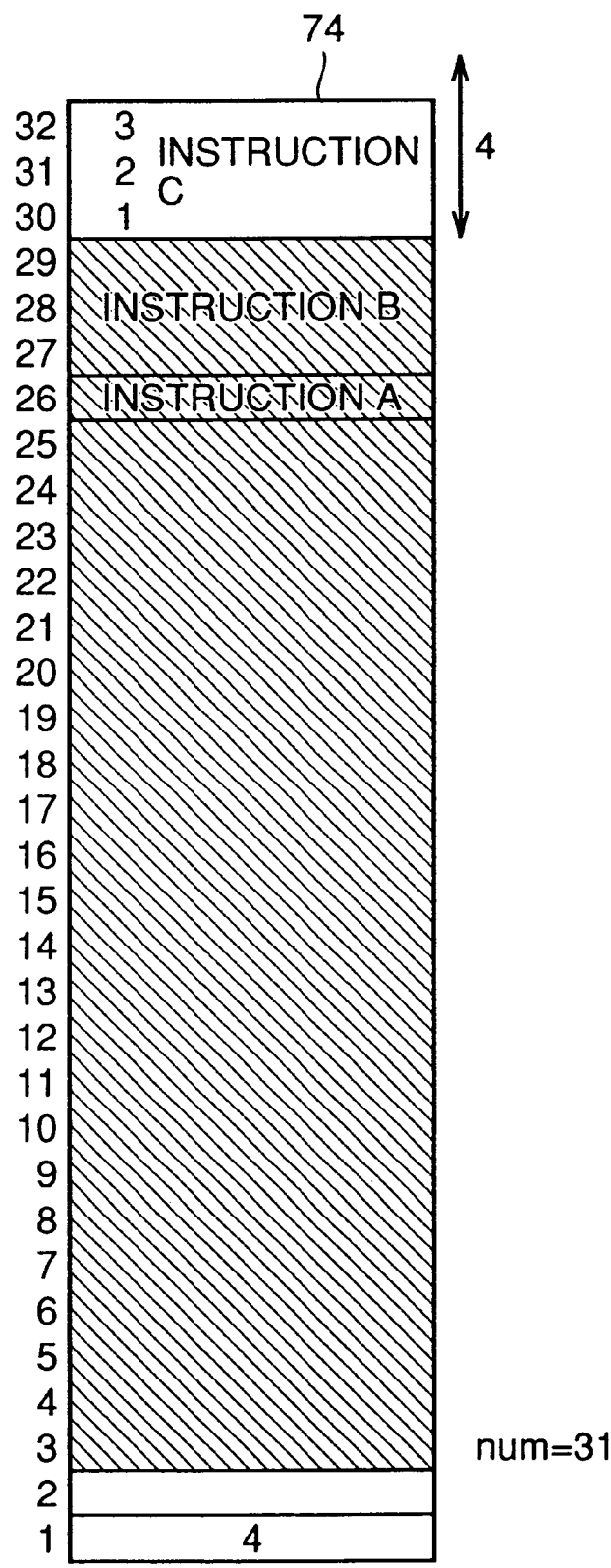

In data count portion 82, num=num+m=27+4=31 is obtained (FIG. 14).

(12) (S24)

Since the relationship of num>=28 is satisfied, Full check portion 86 sets OFIFO_full_flag_m.

(13) (S25)

Figure 15:
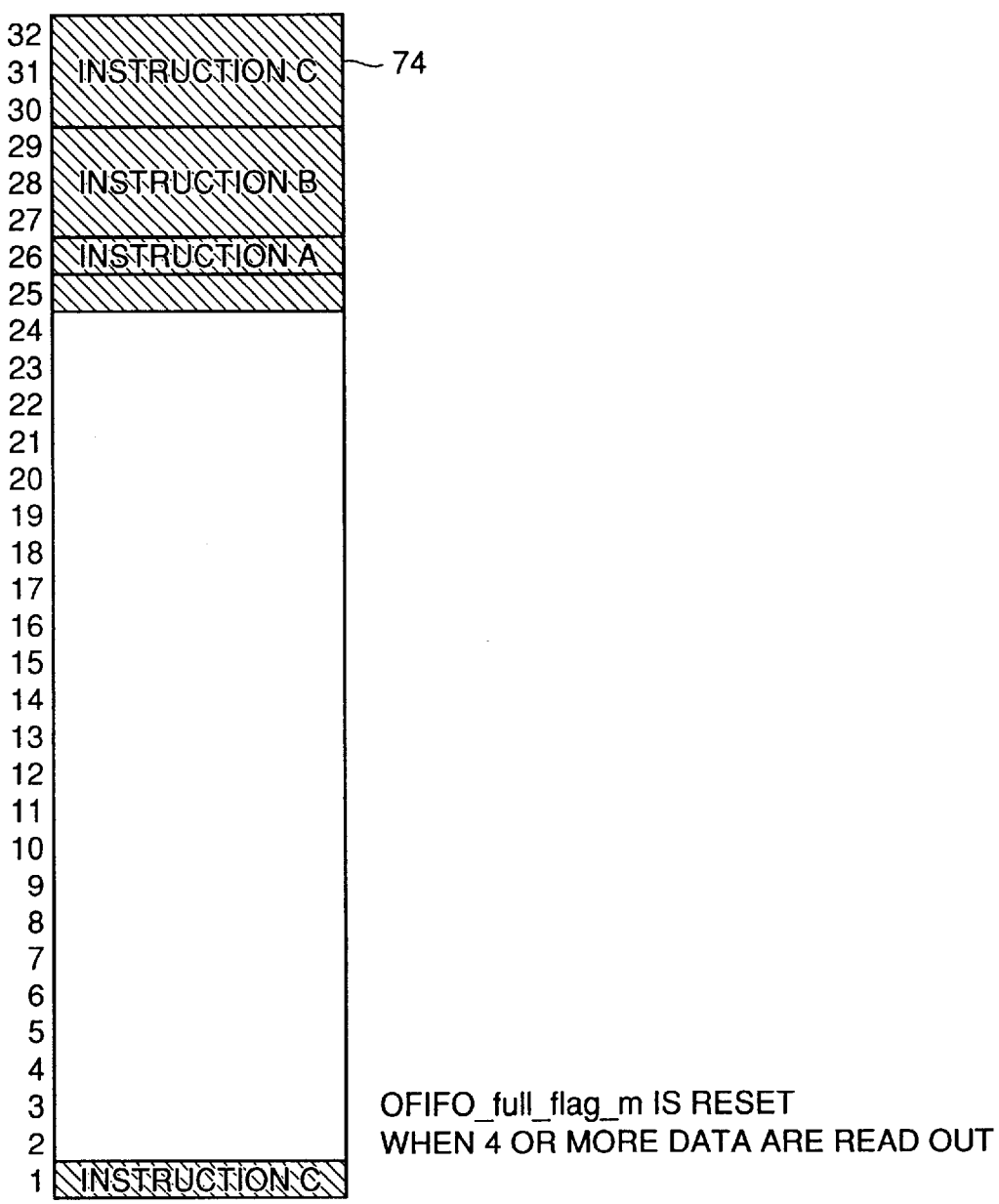

Since OFIFO_full_flag_m is equal to 1, Full check portion 86 repeats the processing from S23 to S25 until OFIFO_full_flag_m becomes equal to 1. When four or more data are read out from output FIFO 74 and OFIFO_full_flag_m is reset to 0 (FIG. 15), the control returns to S21, and processing of the next instruction starts.

According to the device of this embodiment, as described above, it is determined whether output FIFO 74 contains a free space or not, and the data can be written into output FIFO 74 before all the data is read if output FIFO 74 has a sufficient free space. As a result, there is no possibility of suspension of writing into output FIFO 74, and output FIFO 74 can be used efficiently for improving the data transfer processing speed.

Third Embodiment

According to the second embodiment described above, the output FIFO includes the single bank, and therefore the data transfer processing speed is improved by determining whether the output FIFO has a sufficient free space or not, as already described. However, the method of determining whether the output FIFO has a sufficient free space or not can be applied not only to the output FIFO having only one bank but also to the output FIFO having two or more banks. The latter will now be described as a third embodiment.

Figure 16:
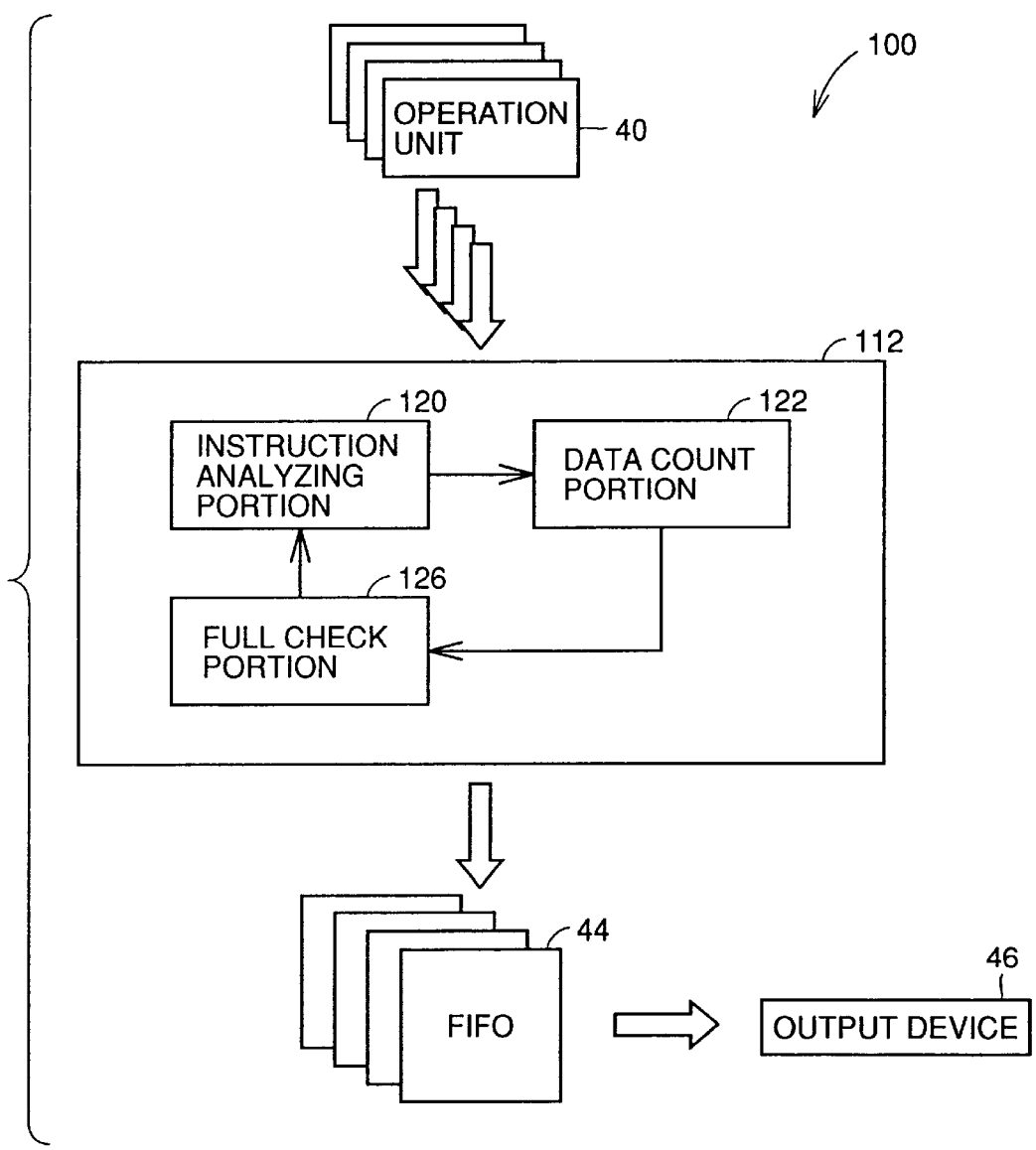
FIG. 16 is a block diagram of a processor including an output FIFO data transfer control device according to a third embodiment of the invention.

Referring to FIG. 16, a processor 100 having an output FIFO data transfer control device 112 according to the third embodiment includes operation units 40, output FIFO data transfer control device 112, and output FIFO 44 which includes the plurality of banks, and can send the data received from output FIFO data transfer control device 112 to output device 46.

Output FIFO data transfer control device 112 includes an instruction analyzing portion 120 for analyzing an instruction sent from operation units 40, a data count portion 122 for checking whether output FIFO 44 has a free space or not, and a Full check portion 126 for checking whether output FIFO 44 is in the Full state or not.

Figure 17:
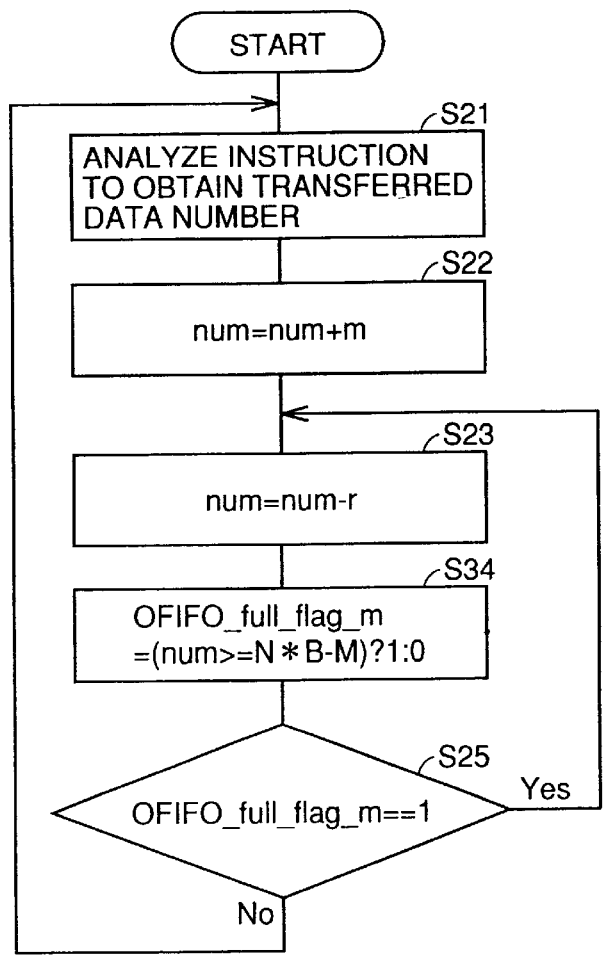
FIG. 17 is a flowchart of a control program of the output FIFO data transfer control device according to the third embodiment of the invention.

Referring to FIG. 17, output FIFO data transfer control device 112 operates as follows. When instruction analyzing portion 120 receives the instruction for data writing into output FIFO 44 from operation unit 40, it obtains the number (m) of data to be written, and writes the data into output FIFO 44 (S21). Data count portion 122 adds value m obtained by instruction analyzing portion 120 to counter value num, which is kept in itself and represents the number of data stored in output FIFO 44. Thus, the following calculation is performed (S22).

$$num=num+m \quad (4)$$

When data is read from output FIFO 44, data count portion 122 subtracts the number r of read data from counter value num. Thus, the following calculation is performed (S23).

$$num=num-r \quad (5)$$

Data count portion 122 determines whether value num of the counter obtained by the above calculation is equal to or larger than value (NN=N*B−M, where B is the number of banks) obtained by subtracting the maximum number (M) of data, which can be transferred by one instruction, from total size (N*B) of output FIFO 44 (S24). If num>N*B−M, flag OFIFO_full_flag_m is set (S34). Otherwise, flag OFIFO_full_flag_m is reset (S34). This can be written in C notation as follows:

$$\text{OFIFO\_full\_flag\_}m = (num >= N*B-M)?1:0 \qquad (7)$$

When Full check portion 126 determines that OFIFO_full_flag_m is equal to 1, the processing returns to S23 (S25), and the processing from S23 to S25 is repeated until OFIFO_full_flag_m is reset. Thus, output FIFO data transfer control device 112 does not accept the next instruction until the data is read out from output FIFO 44 and the conditions in formula (6) are no longer satisfied. When the conditions of formula (6) are satisfied, the control returns to S21 for processing the next instruction.

Figure 18:
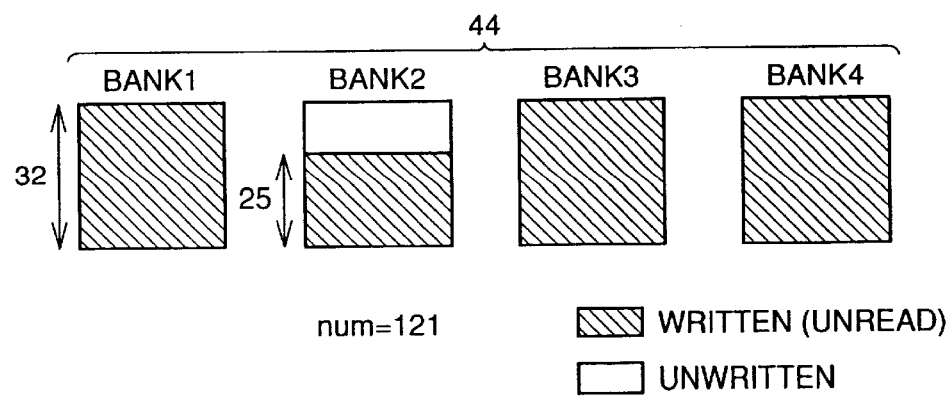
FIG. 18 is a schematic view of an FIFO for showing an operation of the output FIFO data transfer control device according to the third embodiment of the invention.

A specific example of the state of output FIFO 44 during the above processing will now be described. As shown in FIG. 18, it is assumed that output FIFO 44 includes four banks each having a size of 32 (B=4). Operation units 40 are four in number, and therefore up to four data can be simultaneously transferred to output FIFO 44 (M=4). In this case, NN=N*B−M of formula (7) is calculated as NN=32*4−4=124. When num>=124, OFIFO_full_flag_m is set.

For example, it is assumed that 121 data are written into output FIFO 44, and no data is yet read out (num=121) as shown in FIG. 18. In this case, the following instructions are issued, and two data are read out from output FIFO 44 for a period between instructions A and B.

Instruction A: transfer of one (two read out)

Instruction B: transfer of three

Instruction C: transfer of four

In this case, the state of output FIFO 44 changes as follows in accordance with the specific operations.

(1) (S21)

Instruction analyzing portion 120 analyzes instruction A to obtain m=1. Also, one data is written into output FIFO 44.

(2) (S22)

In data count portion 122, num=121+1=122 is obtained (3) (S23)

In response to reading of two data, num=122−2=120 is calculated in data count portion 122.

(4) (S24)

Since num>=124 is not satisfied, Full check portion 126 resets OFIFO_full_flag_m.

(5) (S25)

Since OFIFO_full_flag_m is equal to 0, the control returns to S21, and processing of the next instruction (instruction B) starts.

(6) (S21)

Instruction analyzing portion 120 analyzes instruction B to obtain m=3. Three data are written into output FIFO 44.

(7) (S22 and S23)

In data count portion 122, num=120+3=123 is obtained. No data is read out so that r is equal to 0 (r=0). Therefore, num is equal to 123 (num=123).

(8) (S24)

Since the relationship of num>=124 is not satisfied, Full check portion 126 resets OFIFO_full_flag_m.

(9) (S25)

Since OFIFO_full_flag_m is equal to 0, the control returns to S21, and processing of the next instruction (instruction C) starts.

(10) (S21)

Instruction analyzing portion 120 analyzes instruction C to obtain m=4. Four data are written into output FIFO 44.

(11) (S22 and S23)

In data count portion 122, num=num+m=123+4=127 is obtained.

(12) (S24)

Since the relationship of num>=124 is satisfied, Full check portion 126 sets OFIFO_full_flag_m.

(13) (S25)

Since OFIFO_full_flag_m is equal to 1, Full check portion 126 repeats the processing from S23 to S25 until OFIFO_full_flag_m becomes equal to 0. When four or more data are read out from output FIFO 44 and OFIFO_full_flag_m is reset to 0, the control returns to S21, and processing of the next instruction starts.

As described above, the device of this embodiment can be applied to output FIFO 44 having the plurality of banks. According to this embodiment, the free space(s) in output FIFO 44 are counted, and thereby it is determined whether output FIFO 44 contains a sufficient free space for data transfer or not. If output FIFO 44 has a sufficient free space, the data can be written into output FIFO 44 without waiting for reading of all the data from output FIFO 44. As a result, the data transfer processing speed can be improved.

Fourth Embodiment

According to the first to third embodiments, the number of data written into each bank of the output FIFO is counted, and it is determined whether the size of the free space in the output FIFO satisfies predetermined conditions or not. This determination of the free space may be performed in the following manner.

Figure 19:
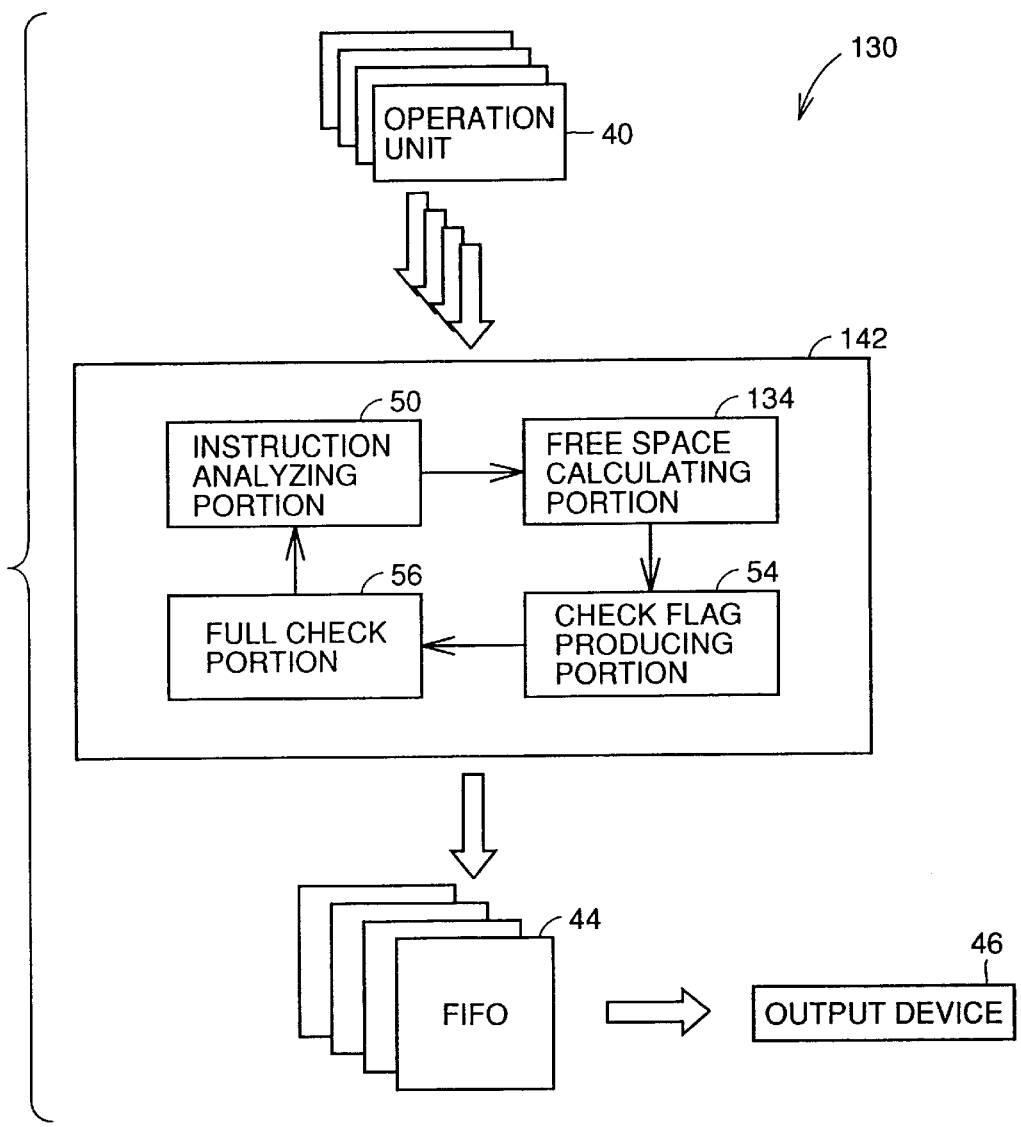
FIG. 19 is a block diagram of a processor including an output FIFO data transfer control device according to a fourth embodiment of the invention.

Referring to FIG. 19, a processor 130 according to a fourth embodiment includes, instead of output FIFO data transfer control device 42 of the first embodiment shown in FIG. 1, an output FIFO data transfer control device 132 which differs from output FIFO data transfer control device 42 in the following points. The only difference is that output FIFO data transfer control device 132 includes a free space calculating portion 144 instead of data count portion 52 in output FIFO data transfer control device 42. Free space calculating portion 134 determines a size of the free space in output FIFO 44 in accordance with the following manner. In FIG. 19, the same parts and portions as those in FIG. 1 bear the same reference numbers, respectively. The parts and portions bearing the same reference numbers have the same functions, and bear the same names, respectively. Accordingly, description thereof is not repeated.

Figure 20:
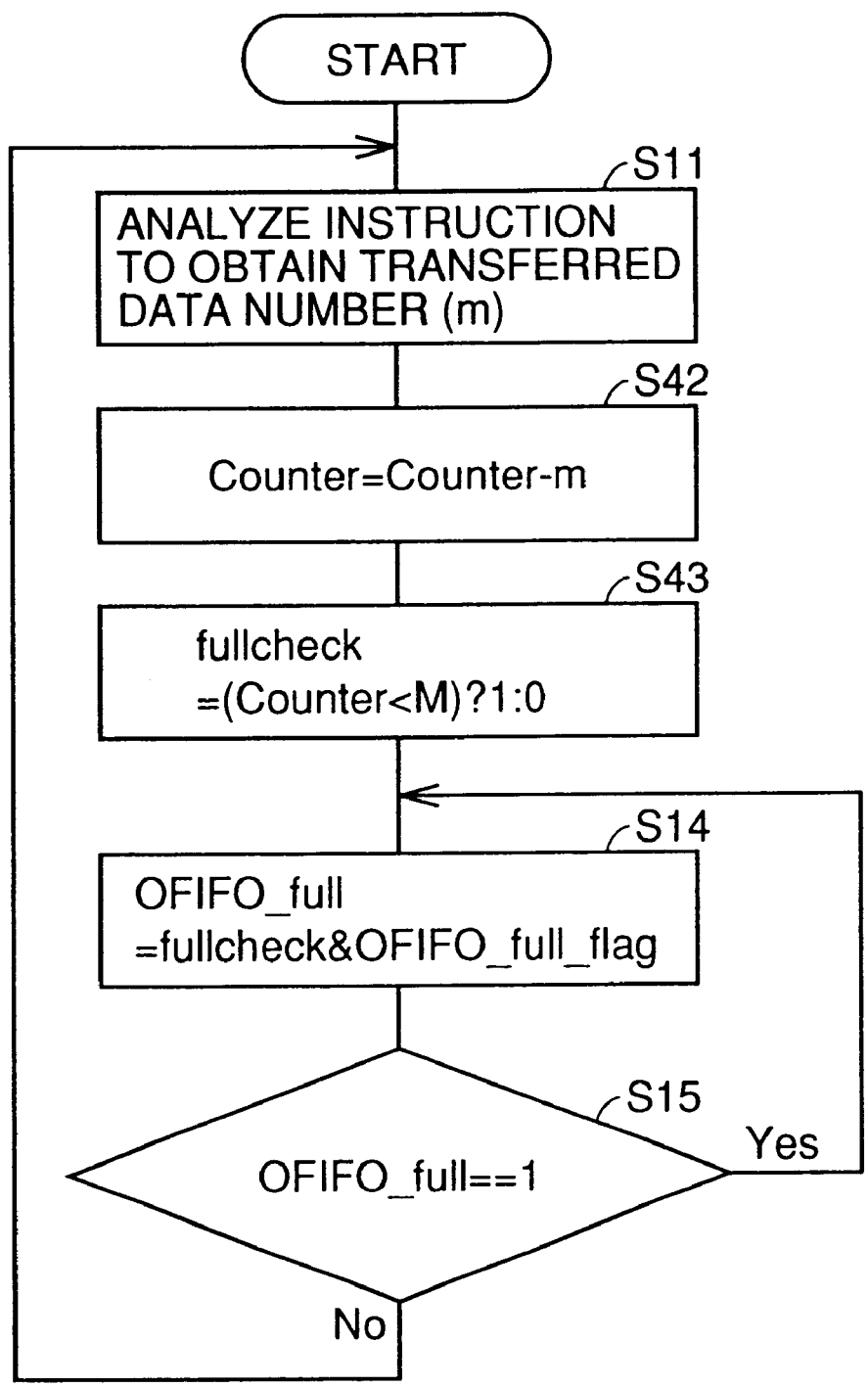
FIG. 20 is a flowchart of a control program of the output FIFO data transfer control device according to the fourth embodiment of the invention.

Referring to FIG. 20, description will now be given on the operation of output FIFO data transfer control device 132 including the function of free space calculating portion 134. Instruction analyzing portion 50 analyzes an instruction to calculate the number (m) of data to be written in output FIFO 44, and writes the data into output FIFO 44 (S11). Free space calculating portion 134 subtracts the value of m from counter value Counter (which is initially equal to N) indicating the number of data which can be written into each bank of output FIFO 44. Thus, the counter value Counter is calculated in accordance with the following formula (S42).

$$\text{Counter} = \text{Counter} - m$$

Check flag producing portion 54 makes a comparison between the counter value Counter and the maximum number (M) of data which can be written into output FIFO 44 by one instruction. Check flag producing portion 54 sets the check flag fullcheck if the counter value Counter is smaller than M, and otherwise resets it (S13). This can be written in C notation as follows.

$$fullcheck=(Counter<M)<=counter)?1:0$$

Full check portion 56 obtains the logical AND between flag OFIFO_full_flag, which indicates whether writing into the next bank in output FIFO 44 is allowed or not, and check flag fullcheck produced by check flag producing portion 54 (S14). It is assumed that flag OFIFO_full_flag takes on the value of 1 if the writing is not allowed, and otherwise takes on the value of 0. It is determined whether result OFIFO_full is 1 or not (S15).

Processing after the above is the same as that of the first embodiment. This fourth embodiment can achieve the effects similar to those by the first embodiment.

Fifth Embodiment

Figure 21:
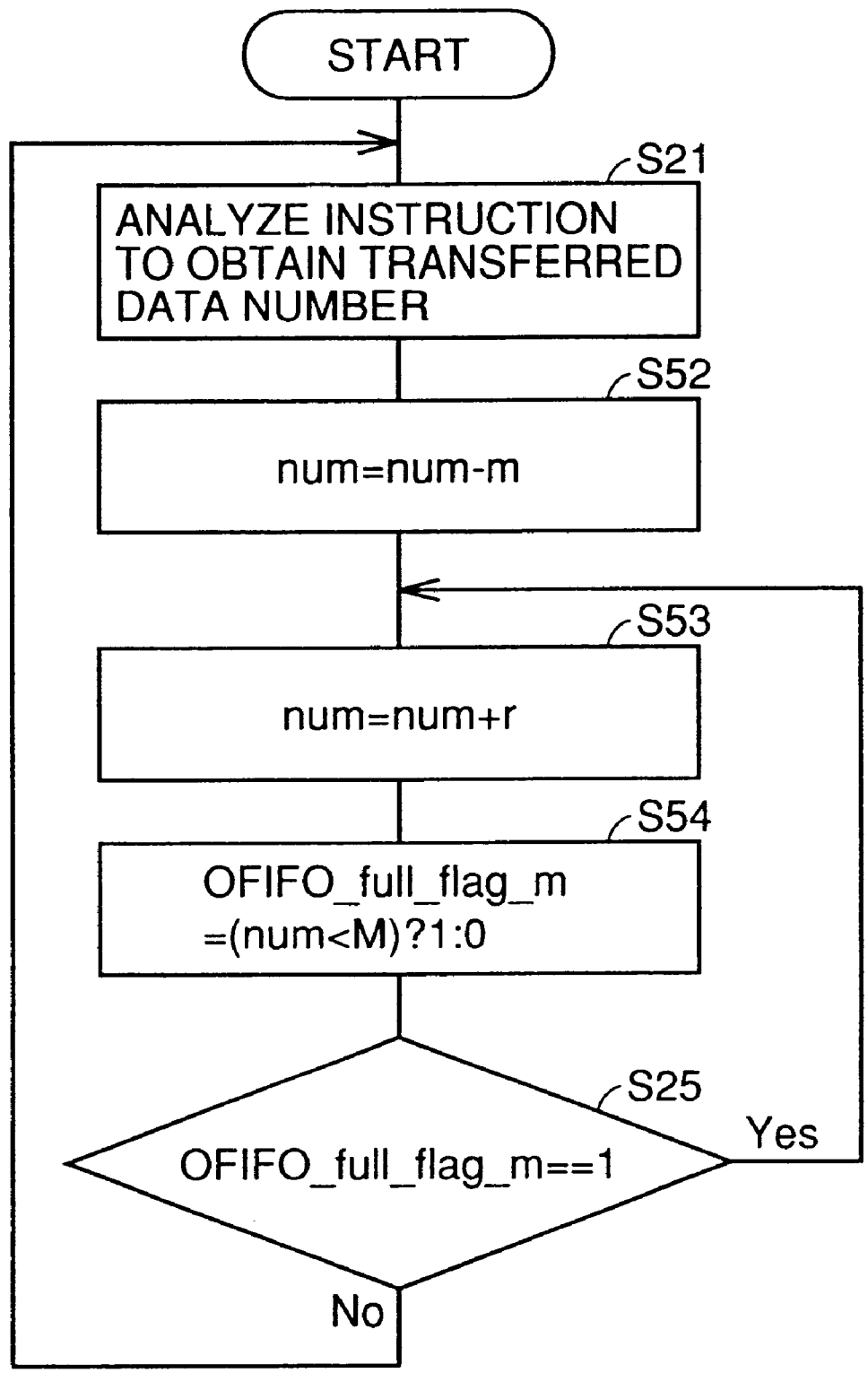
FIG. 21 is a flowchart of a control program of the output FIFO data transfer control device according to a fifth embodiment of the invention.
Figure 22:
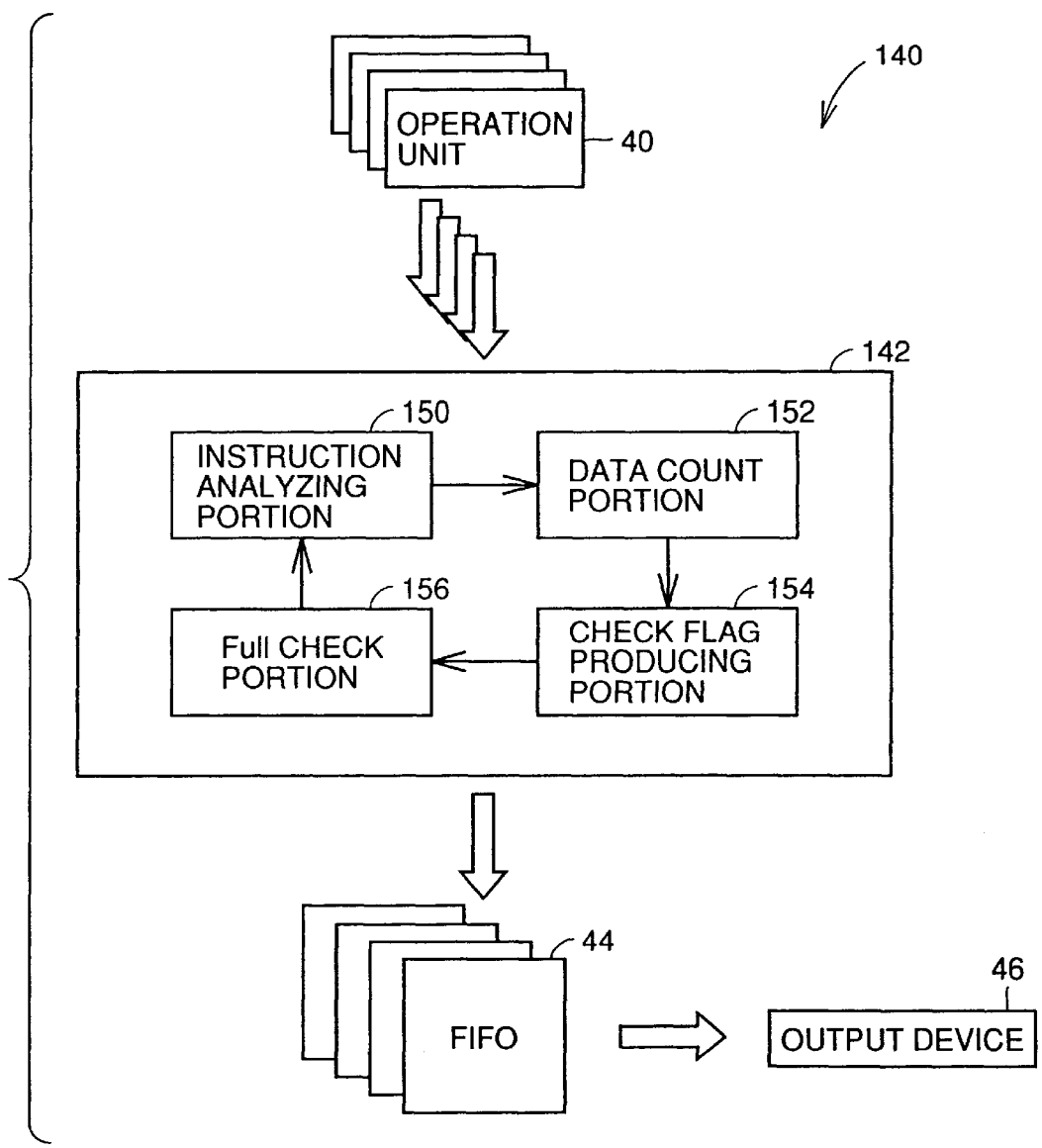
FIG. 22 is a block diagram of a processor including an output FIFO data transfer control device in the prior art.
Figure 23:
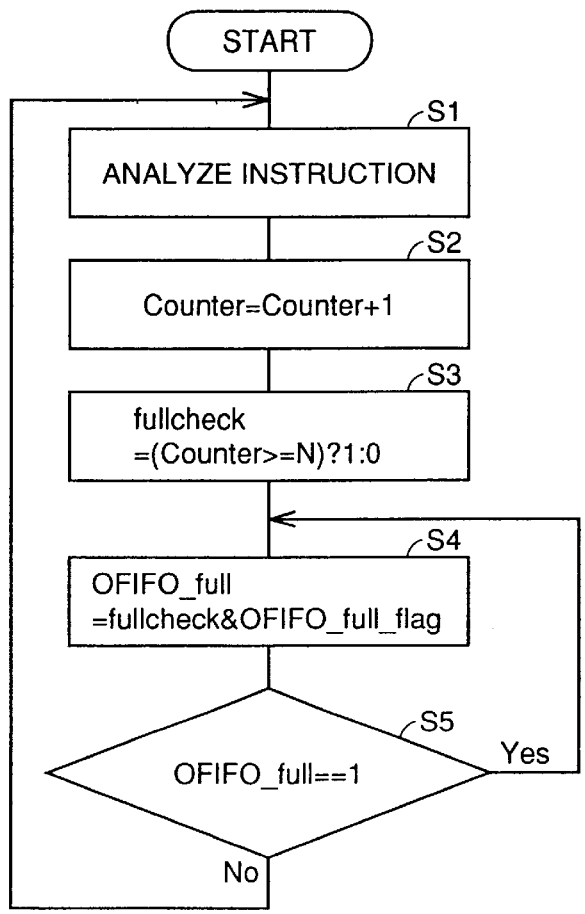
FIG. 23 is a flowchart of a control program of the output FIFO data transfer control device in the prior art.
Figure 24:
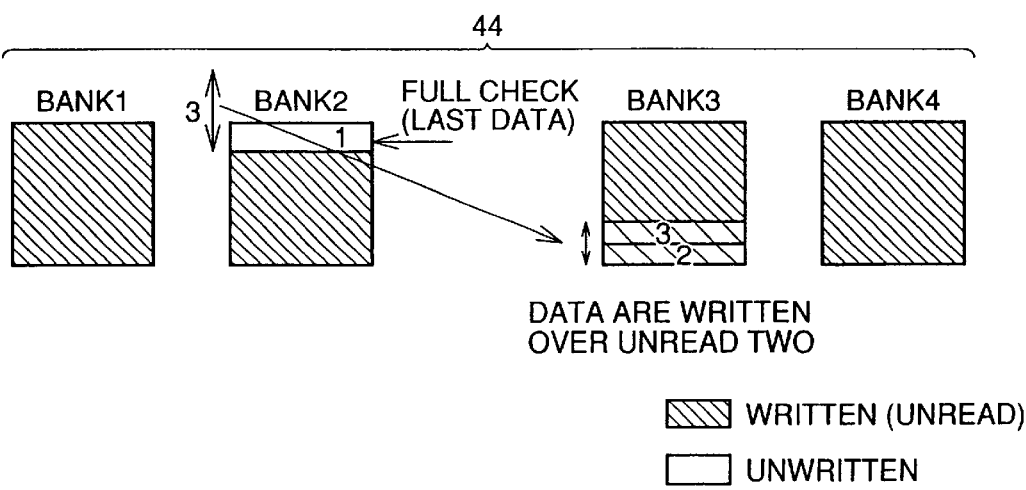
FIG. 24 is a schematic view of an FIFO for showing an operation of the output FIFO data transfer control device in the prior art.

The second embodiment can be modified similarly. In the second embodiment, data count portion 82 for counting the number of data already written in the output FIFO, and Full check portion 86 determines based on the result thereof whether output FIFO 74 is full or not. Instead of this, such a structure may be employed that the size of the writable region is calculated directly from the number of written data and the number of read data, and is maintained, and the this size of the writable region is compared with the maximum number of data which can be written into output FIFO 74 at one time. A device of the fifth embodiment shown in FIG. 21 is configured to perform such processing. The hardware structure is the substantially same as that shown in FIG. 8, and therefore the flow of control will now be described with reference to a flowchart of FIG. 21. In the following description, the respective portions bear the same reference numbers as those in FIG. 8. Although not shown, a free space calculating portion is employed instead of data count portion 82.

Referring to FIG. 21, the output FIFO data transfer control device operates as follows. When instruction analyzing portion 80 receives the instruction for data writing into output FIFO 74 from operation unit 40, it obtains the number (m) of data to be written, and writes the data into output FIFO 74 (S21). The free space calculating portion subtracts the value of m obtained by instruction analyzing portion 80 from the counter value num, which is kept in itself and represents the number of data writable in output FIFO 74. Thus, the following calculation is performed (S52).

$$num=num-m$$

When data is read-from output FIFO 74, the free space calculating portion further operates to add the number r of read data to counter value num. Thus, the following calculation is performed (S53).

$$num=num+r \quad (5)$$

The free space calculating portion determines whether value num of the counter obtained by the above calculation is smaller than the maximum number (M) of data, which can be transferred to output FIFO 74 by one instruction (S24). If num<M, flag OFIFO_full_flag_m is set (S54). Otherwise, flag OFIFO_full_flag_m is reset (S54). This can be written in C notation as follows:

$$OFIFO\_full\_flag\_m=(num<M)?1:0 \quad (6)$$

When Full check portion 86 determines that OFIFO_full_flag_m is equal to 1, the processing returns to S23 (S25), and the processing from S23 to S25 is repeated until OFIFO_full_flag_m is reset.

Processing after the above is the same as that of the second embodiment, and similar effects can be achieved.

Similar concepts can be applied to the third embodiment, although the initial value of num is equal to (N*B).

According to the invention, as described above, it is necessarily determined whether writing of the next data causes no disadvantage or not, before reaching the end of the bank. Therefore, there is no possibility of occurrence of the overwrite of data. Processing for preventing the overwrite of data by a program is not required so that the data transfer processing speed can be improved.

When a free space equal to or larger than the maximum amount of data which can be transferred at one time, or when the next bank attains the unfull state, processing of the next instruction may start. In this case, the overwriting can be reliably prevented even if the maximum amount of data is transferred to the output FIFO storage device in accordance with the next instruction. Therefore, processing for preventing the overwrite of data by a program is not required so that the data transfer processing speed can be improved.

According to another aspect of the invention, the next instruction is processed necessarily after the confirmation of presence of a sufficient free space. Therefore, there is no possibility of occurrence of the overwrite of data. Processing for preventing the overwrite of data by a program is not required so that the data transfer processing speed can be improved.

Either of the case where the output FIFO storage device include the plurality of banks, or the case where it includes the single bank, the data transfer processing speed can be increased.

The processing may be performed to process the next instruction only when the free space of the output FIFO storage device is equal to or larger than the maximum amount of data, which can be transferred at one time. Thereby, the overwrite of data can be reliably prevented even if the maximum amount of data is transferred in accordance with the next instruction. Accordingly, processing for preventing the overwrite of data by a program is not required so that the data transfer processing speed can be improved.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A first-in first-out data transfer control device comprising:
   an instruction analyzing circuit for analyzing an instruction for data transfer by an operation unit to a first-in first-out storage device formed of a plurality of banks and having a function of issuing a full flag when a bank next to a bank being in a writing state is in a full state, calculating an amount of data to be transferred, and writing said data into said first-in first-out storage device;
   a data count circuit for calculating, from the data amount calculated by said instruction analyzing circuit, an amount of the data written in the bank being in an outputting state, and issuing a determination flag by determining whether the free space of the bank being in the outputting state satisfies predetermined conditions or not; and a full check circuit for inhibiting processing of a next instruction until said determination flag sent from said data count circuit or said full flag issued from said first-in first-out storage device is reset.

2. The first-in first-out data transfer control device according to claim 1, wherein said data count circuit calculates the amount of data written in the bank being in the outputting state from the data amount calculated by said instruction analyzing circuit, and issues a determination flag by determining whether conditions that the free space in said bank being in the outputting state is equal to or larger than the maximum amount of data being transferable at one time are satisfied or not.

* * * * *